United States Patent [19]

Yamamoto et al.

[11] Patent Number: 5,915,081
[45] Date of Patent: Jun. 22, 1999

[54] ARRAYED RECORDING APPARATUS WITH SELECTABLY CONNECTABLE SPARE DISKS

[75] Inventors: Hitoshi Yamamoto; Masahiro Mizuno; Toshio Matsumoto; Hiroshi Baba, all of Kanagawa, Japan

[73] Assignee: Mitsubishi Denki Kabushiki Kaisha, Tokyo, Japan

[21] Appl. No.: 08/825,265

[22] Filed: Mar. 27, 1997

Related U.S. Application Data

[63] Continuation of application No. 08/243,509, May 16, 1994, abandoned.

[30] Foreign Application Priority Data

May 21, 1993 [JP] Japan .................................. 5-119958

[51] Int. Cl.$^6$ ..................................................... G06F 13/00
[52] U.S. Cl. ................................. 395/182.04; 395/185.09
[58] Field of Search ......................... 395/182.04, 182.05, 395/182.03, 182.06, 182.07, 185.09, 185.01, 185.03; 371/10.2, 10.3

[56] References Cited

U.S. PATENT DOCUMENTS

| | | | |
|---|---|---|---|
| 4,914,656 | 4/1990 | Dunphy, Jr. et al. | 371/10.2 |
| 5,124,987 | 6/1992 | Milligan et al. | 371/10.1 |
| 5,208,813 | 5/1993 | Stallmo | 371/10.1 |
| 5,258,984 | 11/1993 | Menon et al. | 371/10.1 |
| 5,278,838 | 1/1994 | Ng et al. | 371/10.1 |
| 5,379,417 | 1/1995 | Lui et al. | 395/575 |
| 5,390,187 | 2/1995 | Stallmo | 371/10.1 |
| 5,390,327 | 2/1995 | Lubbers et al. | 395/575 |

FOREIGN PATENT DOCUMENTS

WO90/00280  4/1989  WIPO .

OTHER PUBLICATIONS

Jaffe, Architecture of a Fault–Tolerant RAID–5+ I/O Subsystem, System Science 1993 Annual Hawaii International Conference, at 60.

Chandy & Reddy, Failure Evaluation of Disk Array Organizations, Distributed Computing Systems 1993 International COnference, at 319.

Dougherty, Abuzz About Arrays, LAN Magazine, Jul. 1991, at 83.

Dougherty & McLean, RAID 5 Disk–Array Subsystem from NCR, LAN Magazine, Oct. 1991, at 187.

VanName & Catchings, "Hot Swap" Components Help Make LANs Mission Critical, PC Week, Dec. 9, 1991, at 56.

The RAIDbook, Raid Advisory Board (4th Edition, Paul Massiglia ed.), 1994, at chapters 1, 3, 4, 6, and 7.

Copeland & Keller, A Comparison of High–Availability Media Recovery Techniques, Proceedings of the ACM SIGMOD Conference 1989, at 98.

Chen & Patterson, Maximizing Performance in a Striped Disk Array, Proceedings of the ACM SIGARCH Conference 1990, at 322.

Patterson et al., A Case for Redundant Arrays of Inexpensive Disks (RAID), Proceedings of the ACM SIGMOD Conference 1988, at 109.

Patterson, Gibson & Katz A Case For Redundant Arrays of Inexpensive Disks, Dec. 1987, Computer Science Div. U. of California.

*Primary Examiner*—Robert W. Beausoliel, Jr.
*Assistant Examiner*—Norman M. Wright
*Attorney, Agent, or Firm*—Burns, Doane, Swecker & Mathis, L.L.P.

[57] ABSTRACT

The present invention relates to an arrayed recording apparatus having spare devices for replacing faulty disk drives. Each of the SCSI controllers in the arrayed recording apparatus connects to a driver/receiver and further connects to spare disk drives. Each of the SCSI controllers accesses the spare disk drive by setting a receive/enable signal effective to the driver/receiver. Unused ID numbers are assigned to the spare disks. If a disk drive develops a fault, the RAID controller RC requests the SCSI controller to replace the faulty disk drive with the spare disk drive.

It is possible to attain the function of the hot stand-by system without comprising a specific spare controller.

45 Claims, 16 Drawing Sheets

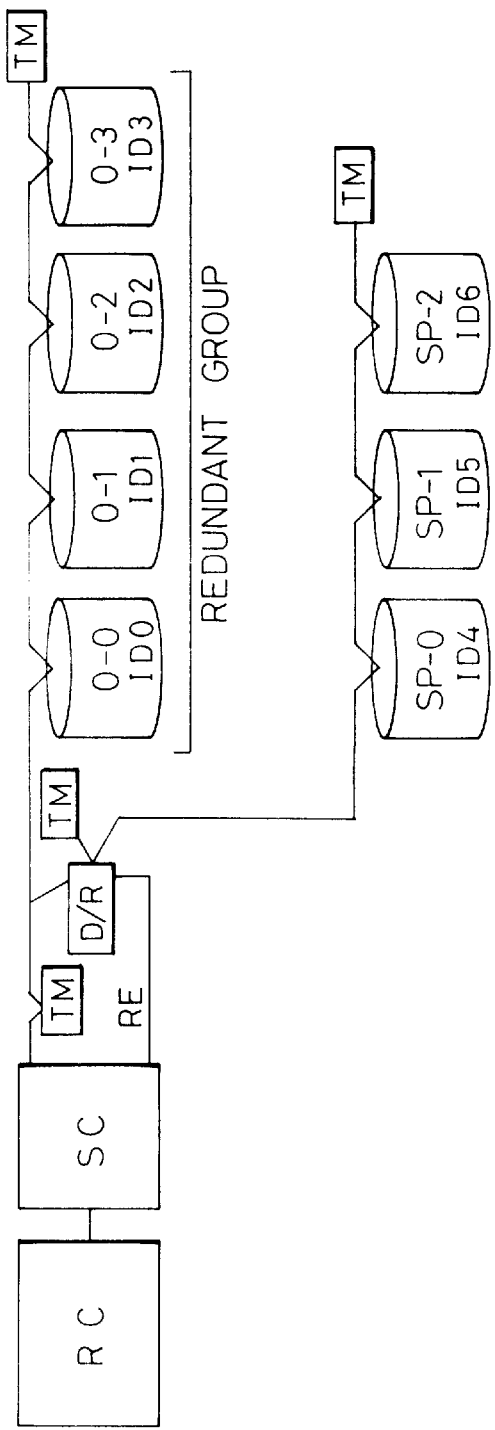
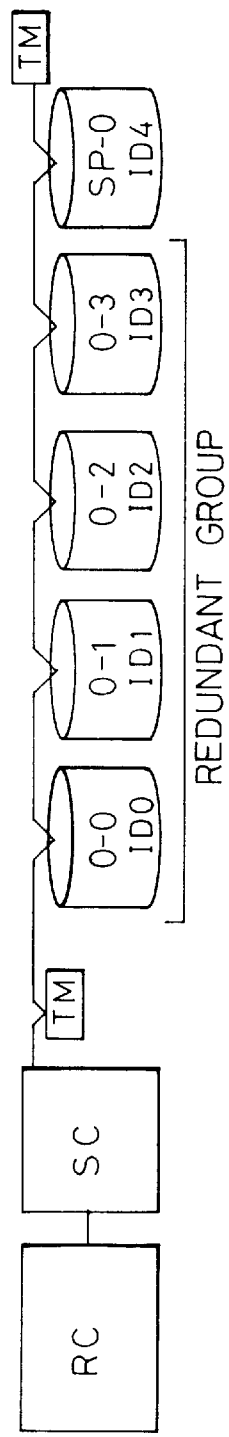

ARRAYED RECORDING APPARATUS WITH SELECTABLY CONNECTABLE SPARE DISKS

This application is a continuation of application Ser. No. 08/243,509, filed May 16, 1994, now abandoned.

BACKGROUND OF THE INVENTION

1. Field of the Invention

This invention relates to a hot stand-by system of a disk array drive which arrays plural magnetic disk drives for accessing data.

2. Description of the Related Art

FIG. 18 shows a configuration of a conventional disk array drive. This figure illustrates especially the disk array drive which has a hot stand-by system. Here, a hot stand-by system is one which provides the spare system always ready for service.

If the disk drive develops a fault, the faulty drive is replaced with a spare drive in the spare system so that the process can continue. When the hot stand-by system is employed, it is possible to exchange the drives automatically because the spare system is always kept ready for service.

In FIG. 18, a RAID controller RC and five SCSI controllers SC0 to SC4 are provided. A spare controller SPC has the same functions of the SCSI controller. Disk drives, 0-0 to 4-3 are arrayed in two dimensions. TM is a terminator for terminating a connection of the disk drives. Spare disk drives SP-0 to SP-3 are connected to the spare controller SPC.

Four disk drives are connected to each of the SCSI controllers and the spare controller. Disk drives are connected to each controller with the SCSI interface. The SCSI interface has a capability to connect eight drives maximum. The SCSI interface assigns an identification number (ID number) to each of the drives and identifies a specific drive according to the ID number. Here, the ID number of the SCSI controllers and the spare controller are ID7. The ID number of four disk drives connected to each controller are ID0, ID1, ID2, and ID3 respectively.

The hot stand-by system employed in a conventional disk array drive will be described hereinafter.

In case a failure has occurred in the disk drive 0-2, the RAID controller RC disconnects the SCSI controller SC0 and accesses the spare controller SPC, instead of the SCSI controller SC0 for accessing the disk drives. When the spare controller SPC is used instead of the SCSI controller 0, the disk drives 0-0 to 0-3 connected to the SCSI controller SC0 are replaced by the spare disk drives SP-0 to SP-3 respectively. In this case, the information of the SCSI controller SC0 being replaced by the spare controller is stored in the ID memory 12 (FIG. 2), and all access commands to the SCSI controller SC0 are changed to the access commands to the spare controller SPC in the RAID controller RC.

As described before, it is possible to replace the disk drive by a spare disk drive, without replacing the SCSI controller with the spare controller.

For example, in case that a failure has occurred in the disk drive 0-2, connected to the SCSI controller, it is possible to use the spare disk drive SP-0 connected to the spare controller as an alternate disk. When the disk drive 0-2 is replaced by the spare disk drive SP-0, the RAID controller RC stores the information in the ID memory 12. The RAID controller RC changes the access to the disk drive 0-2 connected to the SCSI controller to the access to the spare disk drive SP-0 connected to the spare controller.

When the faulty disk drive is replaced by the spare disk drive, the RAID controller RC recovers data in the faulty disk drive to the spare disk drive.

In the disk array device, a block including redundant data, called redundant group, is divided into plural disk drives for storing. Therefore, if a failure has occurred in one disk drive, it is possible to recover data in the faulty disk drive by using data in other normal disk drives. For example, if a failure has occurred in the disk drive 0-2, it is possible to recover data in the faulty disk device 0-2 from data in other five normal disk drives because disk drives 1-2, 2-2, 3-2, 4-2, and the disk drive 0-2 compose the redundant group. The RAID controller RC reads out data in these normal disk drives, reproduces data in the faulty disk drive 0-2, and writes the data in the spare disk drive SP0.

Because a conventional disk array drive is composed as described hereinbefore, it is necessary to comprise a specific spare controller SPC for attaining the function of the hot stand-by system. The spare controller SPC is used only when a failure has occurred in the disk drive. Thus, the system itself becomes expensive by always including a spare controller.

SUMMARY OF THE INVENTION

This invention is provided to solve the forgoing problems.

It is an object of the present invention to attain the capability of the hot stand-by system without using a specific spare controller.

It is another object of the present invention to provide an improved arrayed recording apparatus which reduces the time required for recovering data in the faulty disk by using plural spare disk drives to replace a single faulty disk drive.

In order to achieve these objects, an arrayed recording apparatus according to the present invention includes a plurality of recording devices for storing data, a channel controller for accessing the recording devices, a control means for controlling data accesses to the recording devices through the channel controller, and a spare recording device for replacing one of the recording devices and storing data.

The arrayed recording apparatus further includes a selective connect means for selectively connecting the channel controller and the spare recording device, in which the control means requests to connect the channel controller and the spare device to the selective connect means when one of the recording devices is required to be replaced, and changes data accesses to the replaced recording device to data accesses to the spare recording device.

Further, the recording device and the spare recording device have an identification respectively, the control means changes the identification of the recording device designated in a data access command to the identification of the spare recording device to change the data access to the alternated recording device to the data access of the spare device.

Further, according to the present invention, the arrayed recording apparatus may include:

(a) plurality of recording devices for storing data;

(b) a bus for coupling the recording devices and transferring data;

(c) a spare device for replacing one of the recording devices;

(d) selective connect means for selectively coupling the spare device to the bus; and (e) access means for accessing the recording devices through the bus, requesting to couple the spare device and the bus to the selective connect means so as to alternate one of the recording devices to the spare device.

Further, in the arrayed recording apparatus based on the present invention, the access means may include coupling request means for requesting to couple the spare device and the bus to the selective connect means, and the selective connect means may include driver/receiver means for coupling the spare device and the bus according to the coupling request requested by the coupling request means.

In the arrayed according apparatus, the bus may have a plurality of signal lines, the spare device may provide the corresponding signal lines, and the driver/receiver means may have a plurality of line connect means for respectively connecting the corresponding signal lines of the bus and the spare drives according to the coupling request.

In the arrayed recording apparatus, the access means may include direction output means for outputting a direction of data transfer to the driver/receiver means, and switch means for switching the direction of data transfer in the lines connected by the line connect means.

In the arrayed recording apparatus, the access means may assign an identification to each of the recording devices and the spare device respectively, and may include altering access means for altering the identification so as to replace the recording device with spare device.

In the arrayed recording apparatus, the access means may include a SCSI controller, the bus is a SCSI bus and the identification are ID used for SCSI.

In the arrayed recording apparatus, the altering access means may include identification memory means for registering the altered identification, and access change means for changing data accesses with the identification of the replaced recording device to data accesses with identification of the spare device referring to the identification registered by the identification memory means.

In the arrayed recording apparatus, the access means may include control means for accessing the recording devices, recognizing a necessity of the alternation of the recording device, requesting the coupling request means to output the coupling request, and requesting the identification memory means to register the alternated identification.

In the arrayed recording apparatus, the control means may be a RAID controller for configurating redundant groups of data with the recording devices, in which the RAID controller may include recovery means for recovering data in the replaced recording device to the spare device based on redundant groups of data.

In the arrayed recording apparatus, the access means may include a plurality of channel controllers each of which connects more than one recording device through the bus.

In the arrayed recording apparatus, a plurality of selective connect means may be provided and each of the selective connect means may be connected to the channel controllers.

In the arrayed recording apparatus, the plurality of selective connect means may be connected serially and may connect the spare device commonly.

In the arrayed recording apparatus, each of the selective connect means may connect spare drives.

The present invention includes a method for replacing a faulty recording device in an arrayed recording apparatus having a plurality of recording devices for storing data, a channel controller for connecting the recording devices, a control means for controlling data accesses to the recording devices through the channel controller, a spare device for replacing one of the recording devices and storing data. The method may include the steps of:

a) selectively connecting the channel controller and the spare device;
b) requesting connection of the channel controller and the spare device by the control means;
c) registering the replacement of the recording device by the spare device; and
d) changing an access for the replaced recording device to an access for the spare device based on the registered replacement.

Alternatively, the method may include the steps of;
(a) providing the spare drive connected to the channel controller;
(b) registering the replacement of the recording device and the spare device; and
(c) changing an access for the replaced recording device to an access for the spare device based on the registered replacement.

The providing step may assign identifications to the recording devices and the spare device respectively; the registering steps may store the identifications of the alternated recording device and the spare device; and the changing step may change identification accompanied with an access to the identification of the spare device based on the registered identifications.

BRIEF DESCRIPTION OF THE DRAWINGS

FIG. 12 shows a configuration of a disk array drive arranged in one-dimensional space according to a first embodiment.

FIG. 13 shows a configuration of a disk array drive arranged in one-dimensional space according to a second embodiment.

DESCRIPTION OF THE PREFERRED EMBODIMENTS

Embodiment 1

Figure 1:
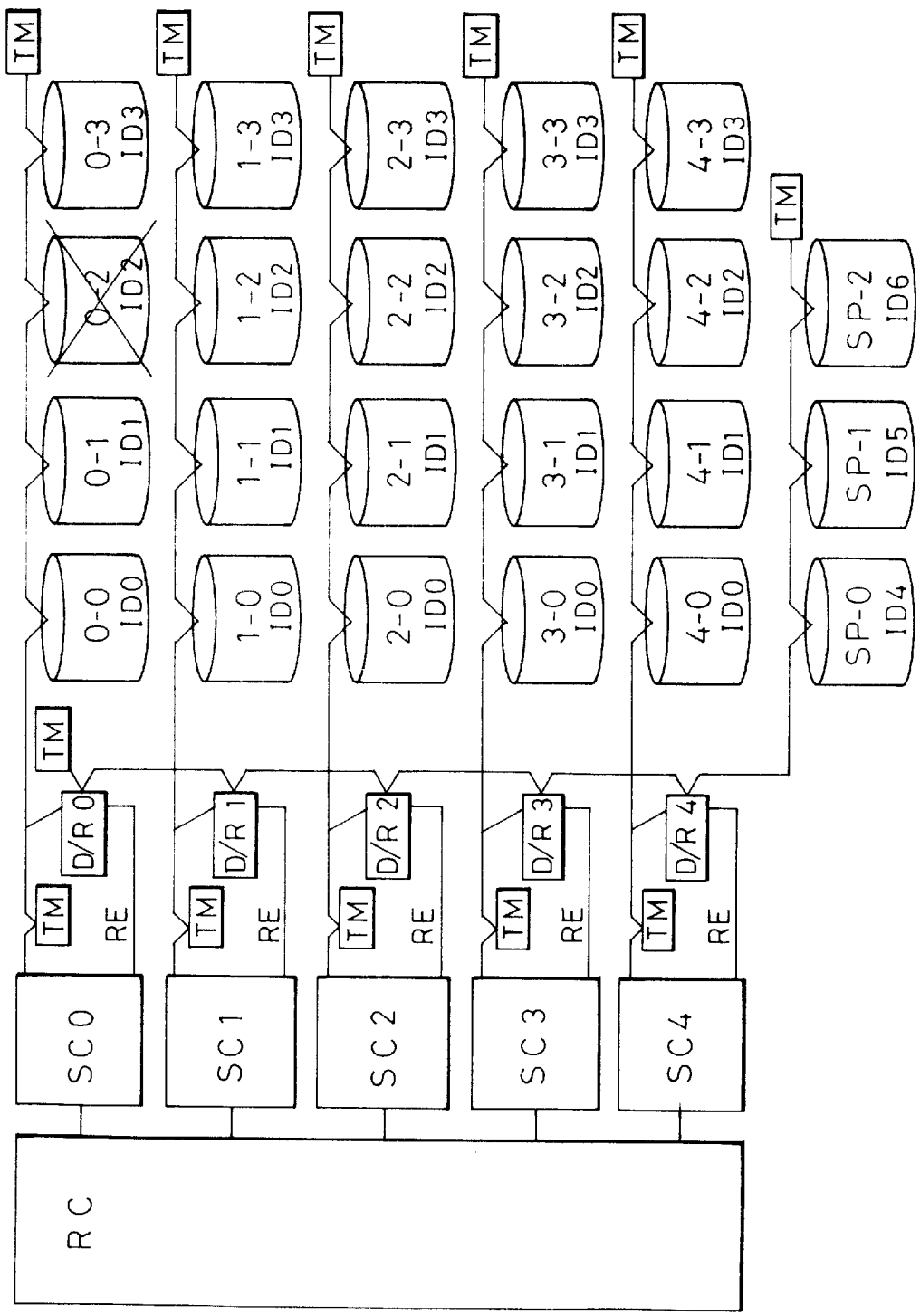
FIG. 1 shows a configuration of a disk array drive according to a first embodiment of the present invention.
Figure 18:
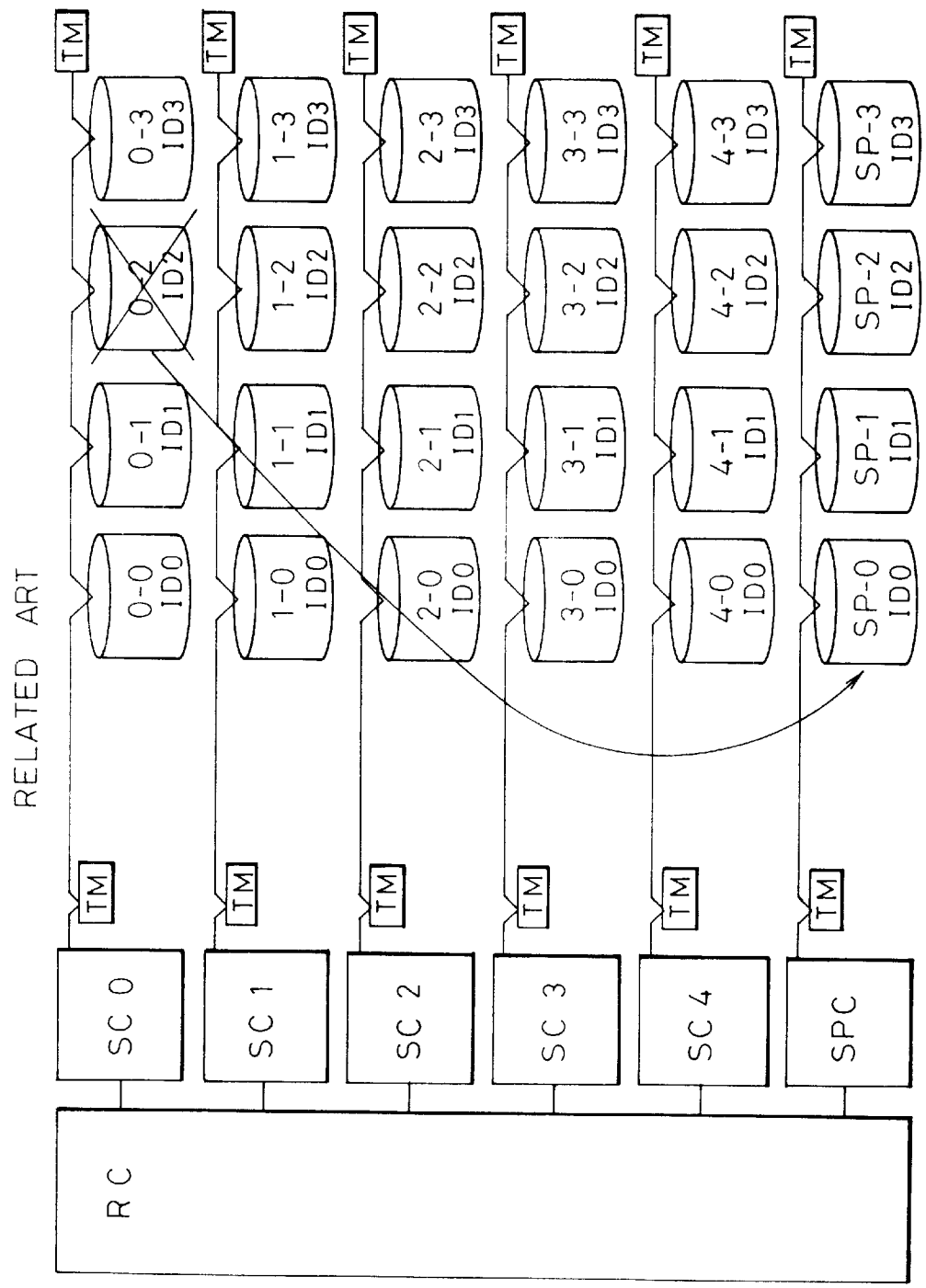
FIG. 18 shows a configuration of a conventional disk array drive.

FIG. 1 shows a first embodiment of the disk array drive, related to this invention. Here, an explanation is omitted about the same elements as in FIG. 18 illustrating the conventional apparatus.

The principal difference from the conventional apparatus is that the spare controller SPC isn't needed. In FIG. 1, a driver/receiver D/R selectively connects each SCSI controller SC0 to SC4 and the spare disk drives SP0 to SP2. A receive enable signal RE is used to connect the SCSI controller and the spare disk drive.

Here, the ID number of the SCSI controller is ID7, and the ID numbers of the four disk drives are ID0, ID1, ID2, and ID3 respectively.

The SCSI interface has a capability to identify a maximum of eight drives. The ID numbers of the spare disk drives SP-0, SP-1, and SP-2 are ID4, ID5 and ID6 respectively.

The driver/receiver is connected to each of the SCSI controllers and to the spare disk drives SP-0 to SP-2. Each of the SCSI controllers accesses the spare disks by setting the receive enable signal RE effective to the driver/receiver. As described above, ID numbers unused in the SCSI interface are assigned to the spare disk drives. Therefore, by using these identification numbers, it is possible to access the regular disk drives and distinguish from the spare disk drives even if both sets of the disk drives are connected to one SCSI controller.

Figure 2:
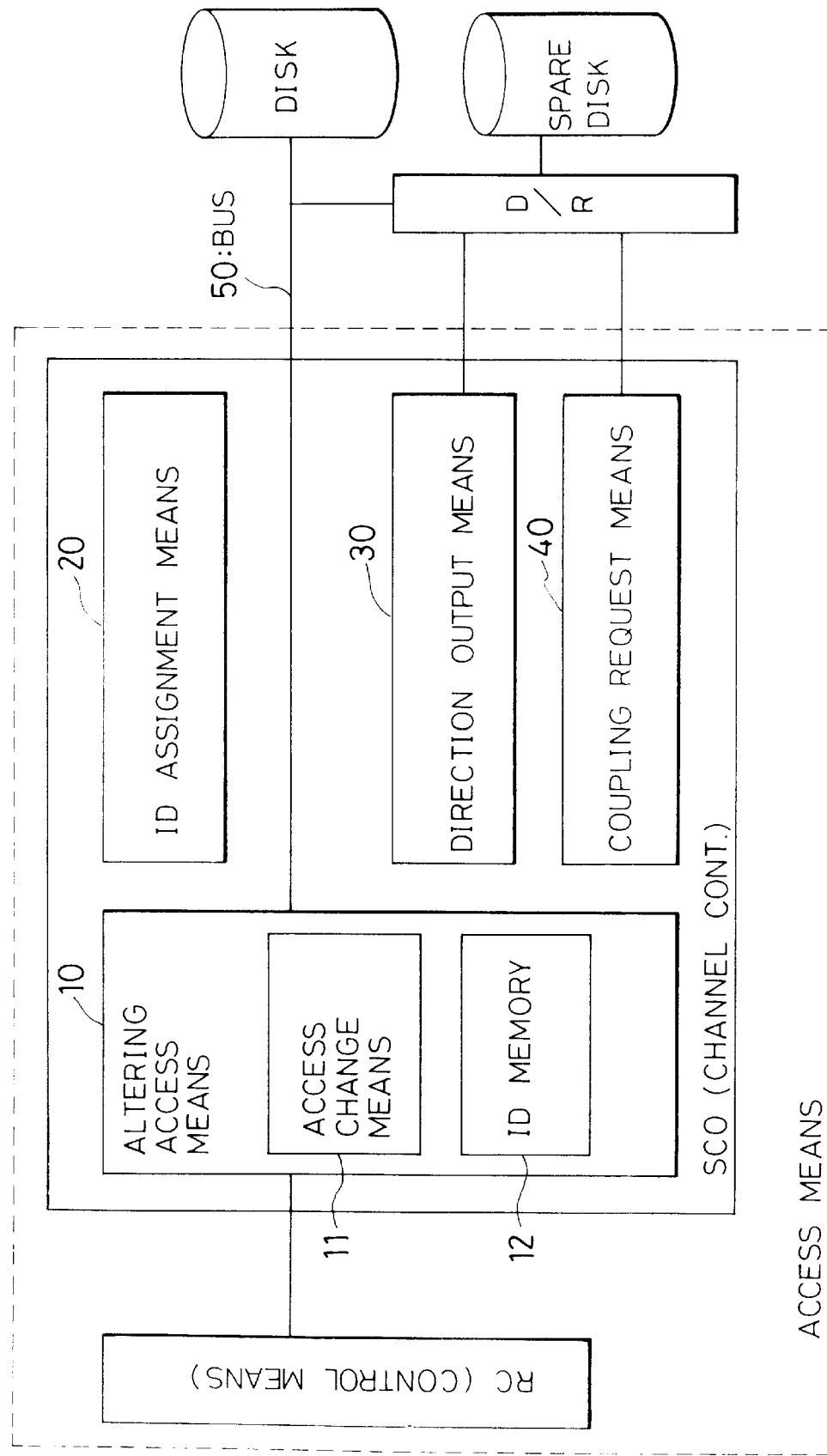
FIG. 2 shows a configuration of a SCSI controller according to an embodiment of the present invention.

FIG. 2 illustrates a block diagram of the SCSI controller SC0 shown in FIG. 1. The SCSI controller replaces a faulty disk with a spare disk by connecting the spare disk to the bus 50 with the driver/receiver as well as accessing data to the disk drive through the bus 50. Each of the SCSI controllers comprises a coupling request means 40 which requests to connect the spare disk drive to the driver/receiver. Further, the SCSI controller includes a direction output means 30 which outputs the direction for transferring data to or from the driver/receiver. In addition, each of the SCSI controllers assigns ID numbers to the disk drives with an ID assignment means 20. The ID assignment means 20 assigns unused ID numbers to the spare disk drives. An altering access means 10 replaces the disk drive with a spare disk drive by changing the identification assigned to the disk drive to the identification of the spare disk drive in an ID memory 12 which memorizes the changed identifications. When the ID memory 12 stores the information of the changed identification, the altering access means 10 converts the access request for the faulty disk drive into an access request for the spare disk drive by changing the identification in the access request received from the RAID controller RC to the identification of the spare disk drive.

Figure 3:
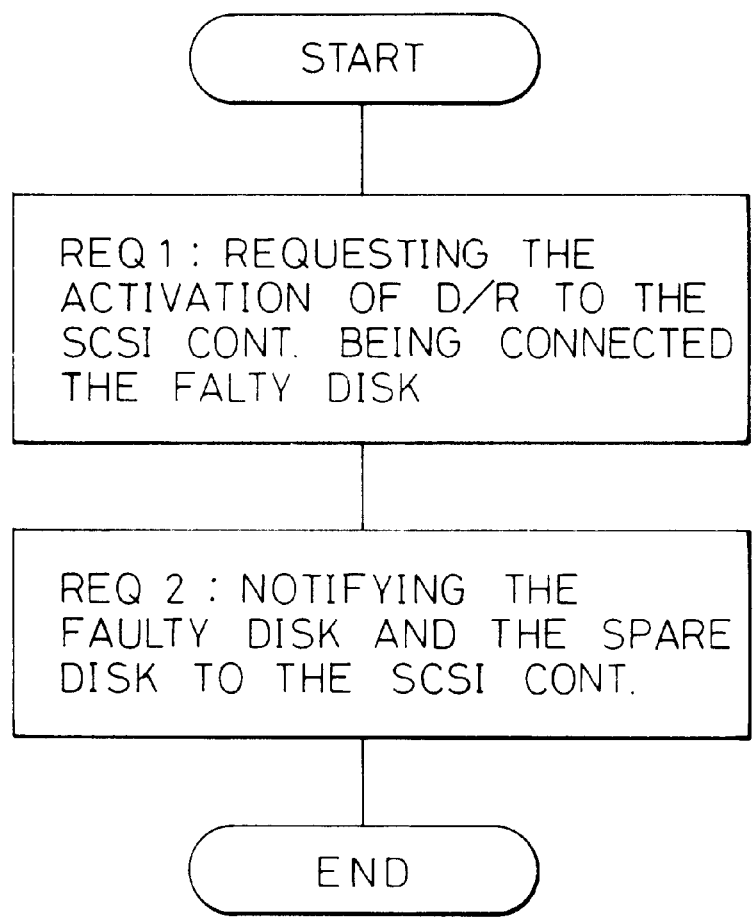
FIG. 3 shows a flow chart of operation of a RAID controller according to an embodiment of the present invention.

If a failure has occurred in the disk drive 0-2, the RAID controller (RC) makes the following two requests to the SCSI controller SC0, as shown in FIG. 3.

Request 1. to have the driver/receiver D/R 0 operate by setting the receive enable signal RE effective.

Request 2. to use the spare disk drive SP-0 in stead of the disk drive 0-2.

Figure 4:
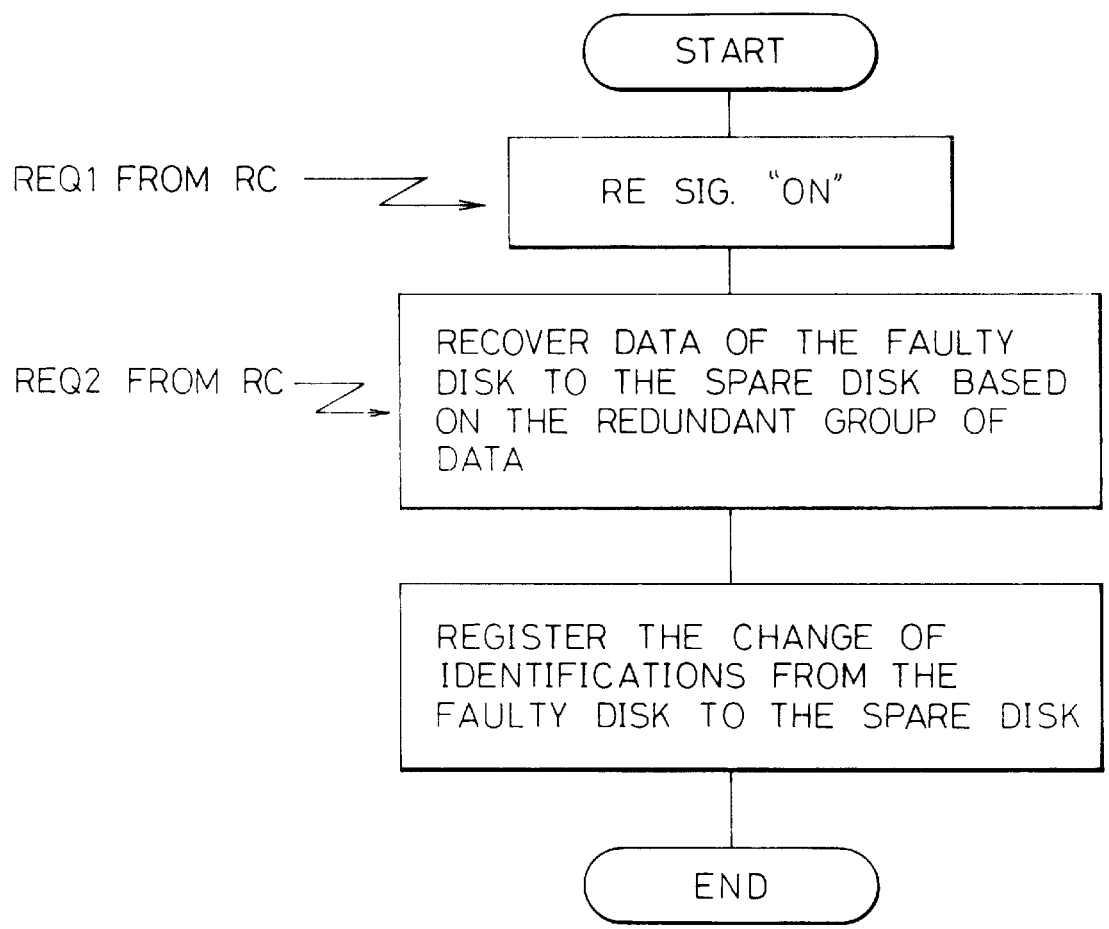
FIG. 4 shows a flow chart of operation of a SCSI controller according to an embodiment of the present invention.

The SCSI controller SC0 operates as follows for the two requests from the RAID controller RC, as shown in FIG. 4.

(1) First, the SCSI controller SC0 sets the receive-enable signal RE effective.

(2) Secondly, the SCSI controller SC0 recovers data to the spare disk drive SP-0 using data in the disk drives 1-2, 2-2, 3-2, and 4-2, and writes the recovered data to the spare disk drive SP-0.

(3) Then, the SCSI controller SC0 stores the ID number (ID4) assigned to the spare disk drive SP-0 corresponding to the ID number ID assigned to the faulty disk drive 0-2, in the ID memory 12. After that, an access request to the disk drive 0-2, is converted to the request to the spare disk drive SP-0, by changing the ID number ID2 to ID4.

In FIG. 2, the altering access means 10 is shown in the SCSI controller, but it is also possible to provide the altering access means 10 in the RAID controller RC. If the altering access means 10 is provided in the RAID controller RC, the access request received from the RAID controller RC to the SCSI controller has already been generated as the access request for the spare disk drive. The SCSI controller accesses the spare disk drive according to the access request without conversion of the access request.

Figure 5:
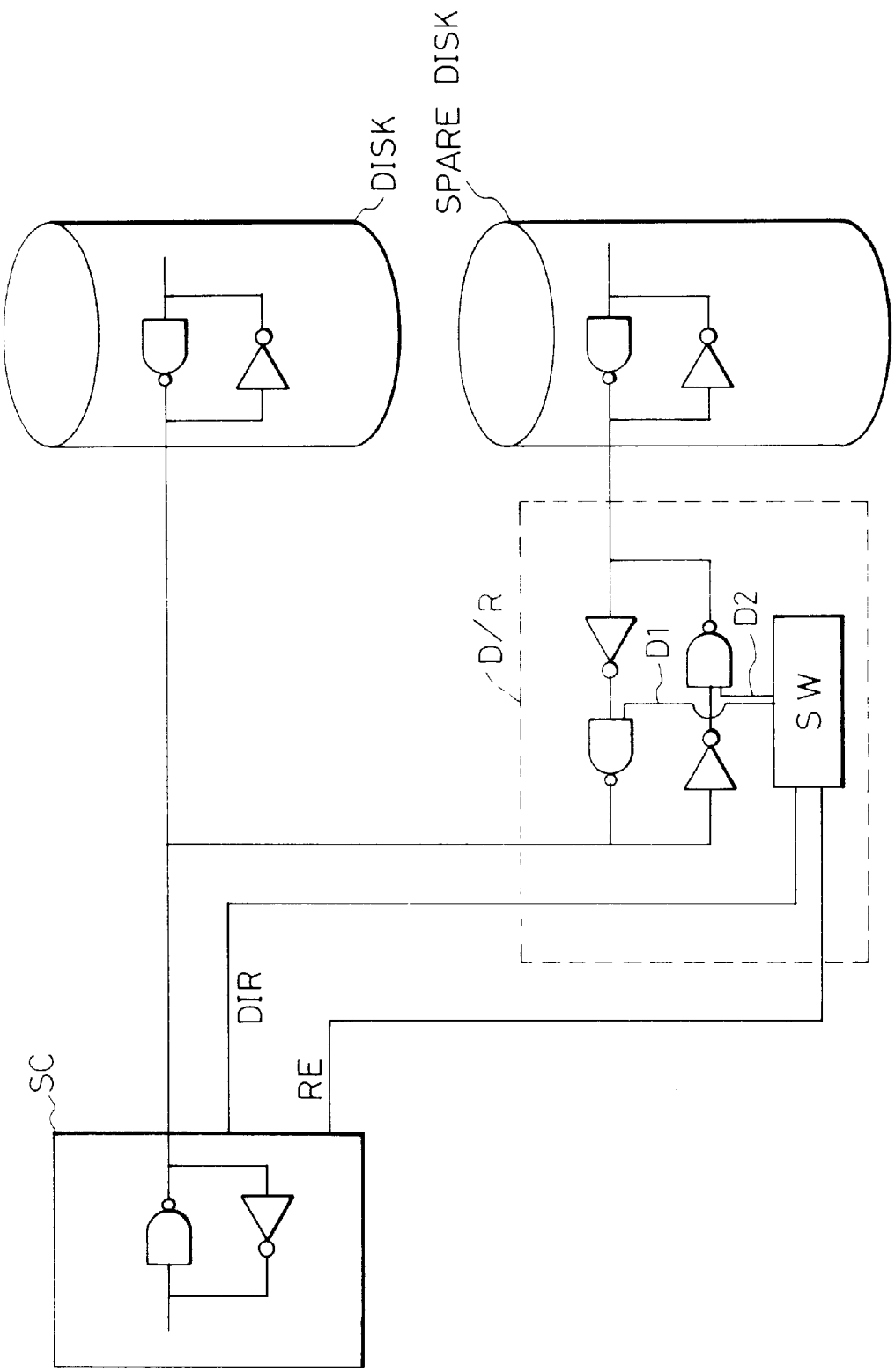
FIG. 5 shows a configuration of a driver/receiver according to a first embodiment.

FIG. 5 illustrates a configuration of the driver/receiver, which is provided for each of signal lines in the SCSI interface. For example, if the SCSI interface is composed of eighteen signal lines in total, eighteen driver/receivers, as shown in the FIG. 5, are provided. The driver/receiver comprises a switch SW. The switch SW inputs the receive enable signal RE from the SCSI controller SC. And, the switch SW inputs the signal DIR in the signal lines composing the SCSI interface. The direction signal DIR shows the direction of the signal. That is, the signal indicates whether data is transferred to the disk drive from the SCSI controller or to the SCSI controller from the disk drive.

The switch SW operates only when the receive enable signal RE is effective. In this case, the switch SW turns on either the signal D1 or the signal D2 in accordance with the direction signal DIR. In case that the direction signal DIR shows the direction to the disk drive from the SCSI controller, the signal D2 is turned on. On the other, if the direction signal DIR shows the direction to the SCSI controller from the disk drive, the signal D1 is turned on.

Figure 6:
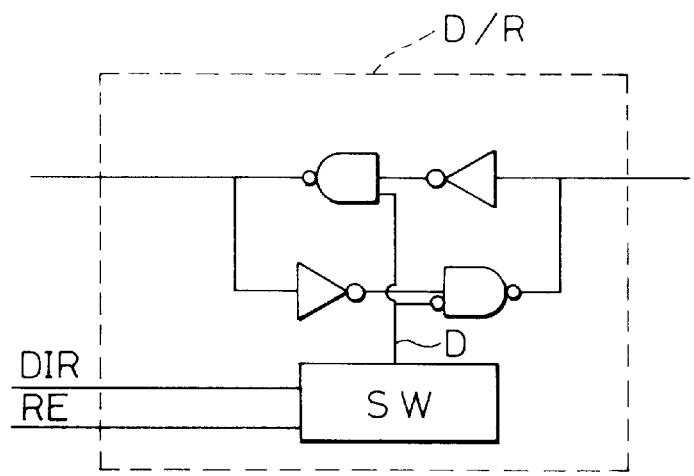
FIG. 6 shows a configuration of a driver/receiver according to a second embodiment.

FIG. 6 illustrates a second embodiment of a driver/receiver based on the present invention. In the first embodiment, the direction was indicated by the signals D1 and D2. But in the embodiment shown in FIG. 6, only the signal D, which turns on and off according to the direction signal DIR, shows the direction.

Figure 7:
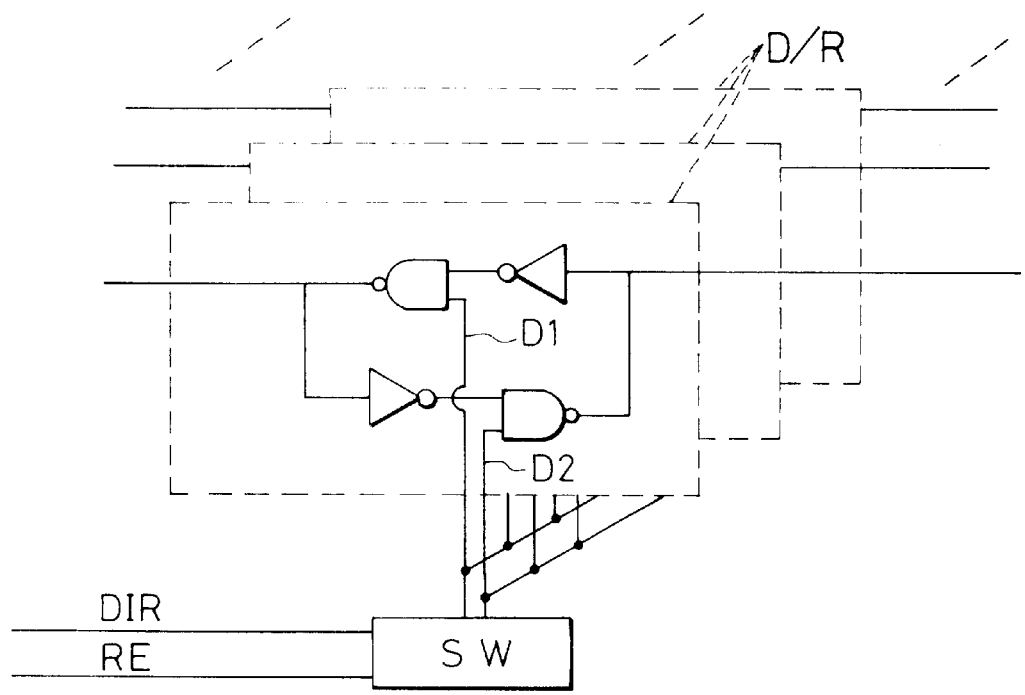
FIG. 7 shows a configuration of a driver/receiver according to a third embodiment.

Further, in FIG. 7, there is shown a third embodiment of the driver/receiver. The above-described driver/receiver is provided for each of the signal lines composing the SCSI interface. Therefore, in order to make the scale of the circuit as small as possible, a switch SW which can be used commonly for the signal lines is provided. In this embodiment, only one switch SW is used. Either the signal D1 or D2 is sent from the switch SW to the driver/receivers connected to each of the signal lines.

Through the above-described operation, the driver/receiver can connect the spare disk drive selectively to the SCSI controller. The spare disk drive connected by the driver/receiver, can be accessed exactly the same way as the usual disk drive. But, the difference is that the disk drive and the spare disk drive have distinctive ID numbers respectively and the SCSI controller distinguishes and accesses the disk drives and the spare disk drives by using the ID numbers.

As has been described, according to this embodiment, it is possible to attain the function of the hot stand-by system without using a specific spare controller.

In the arrayed recording apparatus based on this embodiment, the spare controller SPC isn't needed because the driver/receiver connects the SCSI controller to the spare desk drive when a failure has occurred in the disk drive. That is, the spare disk drive operates under the control of the RAID controller RC because the driver/receiver connects the spare disk drive to the SCSI controller which controls the disk drives.

In the arrayed recording apparatus based on this embodiment, the identifiers are assigned to the disk drives and the spare disk drives described above. The RAID controller RC replaces the disk drive with the spare disk drive by using the identifiers assigned on each of the drives. Therefore, even if the disk drive and the spare disk drive are connected to one SCSI controller, it is possible to access the correct disk drive by distinguishing the disk drive from the spare disk drive.

Embodiment 2

Figure 8:
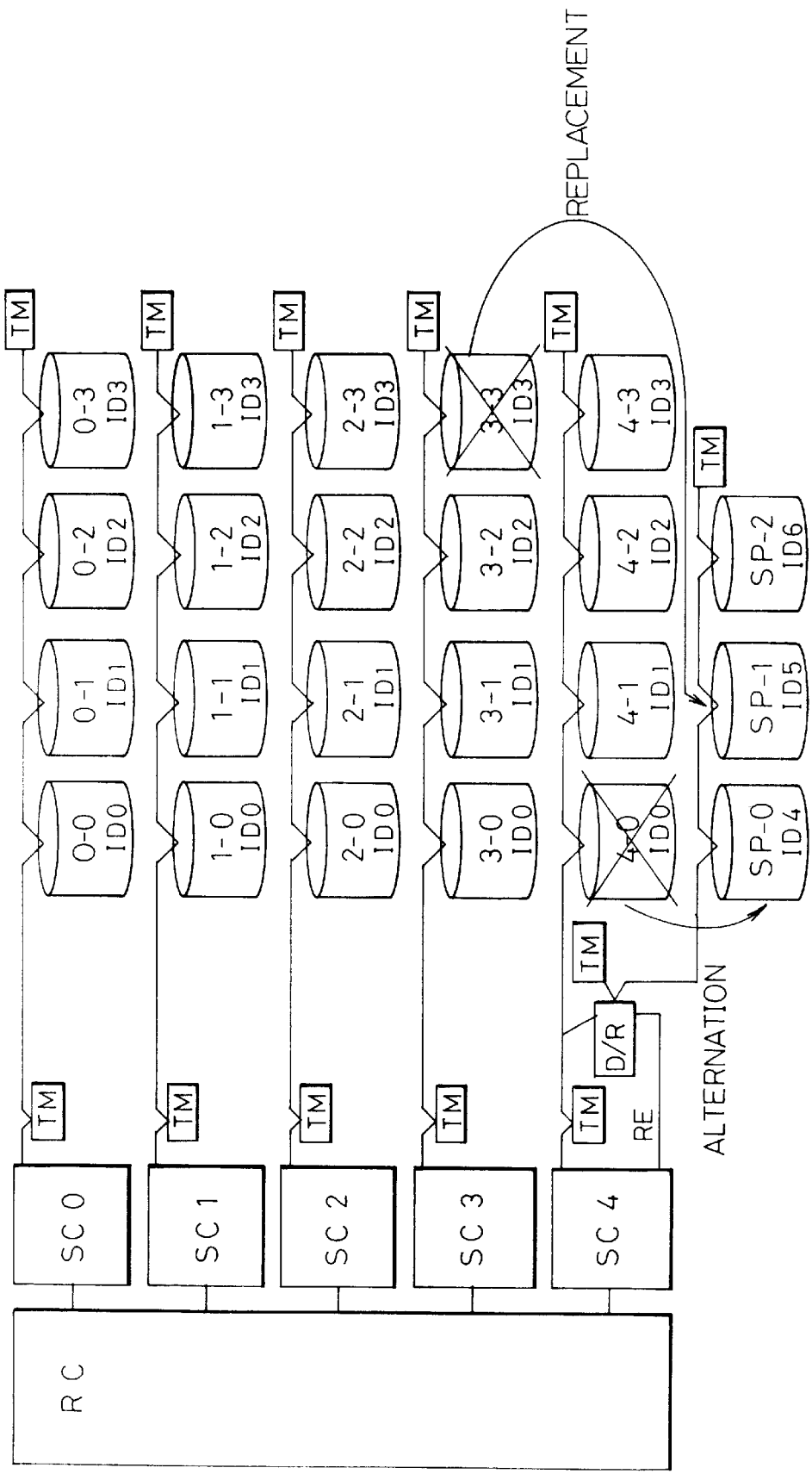
FIG. 8 shows a configuration of a disk array drive according to a second embodiment of the present invention.

In the first embodiment, the driver/receivers are connected to each of the SCSI controllers respectively. As shown in FIG. 8, the D/R can be connected to one SCSI controller.

In FIG. 8, the driver/receiver is connected to the SCSI controller 4 and three spare disk drives are connected to the driver/receiver. In case a failure has occurred in the disk drive 4-0, the RAID controller RC requests the SCSI controller 4 that the disk drive 4-0 should be exchanged with the spare disk drive SP-0.

Further, if a failure has occurred in the disk drive 3-3, the RAID controller RC replaces the disk drive 3-3 connected to the SCSI controller 3 with the spare disk drive SP-1 connected to the SCSI controller 4.

Thus, in case that the disk drive 4-0 is replaced with the spare disk drive and the disk drive 3-3 is alternated with the spare disk dive SP-1, two accesses to the SCSI controller 4 compete consequently. The disk array drive records data, including redundant data, into plural disk drives. Therefore, accesses to both disk drive 3-3 and disk drive 4-3 happen simultaneously. The disk drive 3-3 is replaced with the spare disk drive SP-1 and this spare disk drive SP-1 is connected to the SCSI controller 4 through the driver/receiver. At a result, both the access to the disk drive 4-3 and the access to the spare disk drive SP-1 compete. When two accesses compete, one access is kept waiting in the SCSI controller 4 until the processing of the other access is completed. The order of the accesses can be decided by the RAID controller RC instead of the SCSI controller 4.

Embodiment 3

In the preceding embodiments, the three spare disk drives are connected in series. But, as shown in FIG. 9, the spare disk drives can be connected in parallel through driver/receivers.

Figure 9:
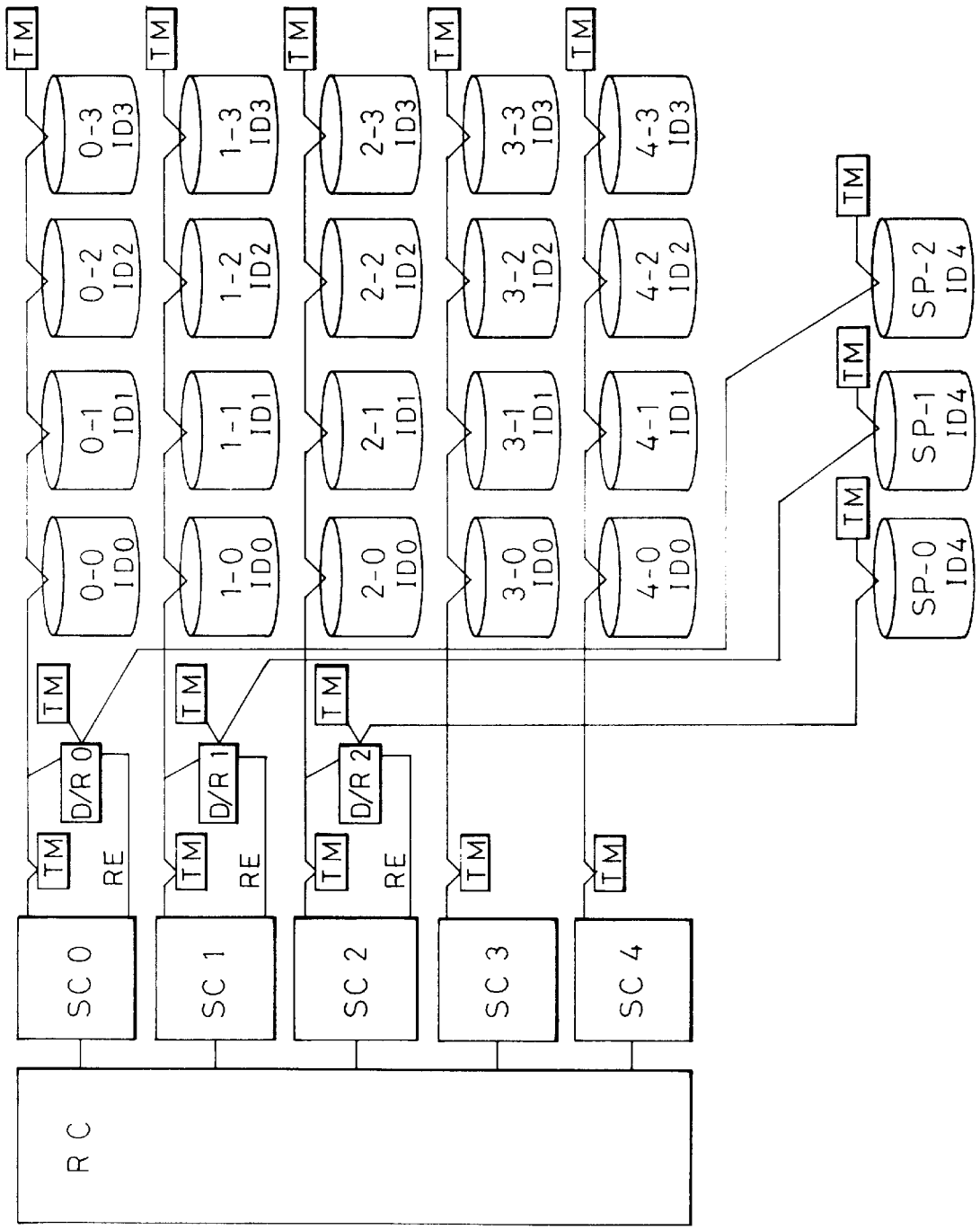
FIG. 9 shows a configuration of the disk array drive according to a third embodiment of the present invention.

FIG. 9 shows a third embodiment in which three driver/receivers are used, and one spare disk drive is connected to each of the driver/receivers. In this embodiment, all the spare disk drives use ID number ID4. Here, ID5 and ID6 aren't used as the ID numbers, and additional spare disk drives assigned as ID5 and ID6 can be further connected in series, adding to the spare disk drives ID4.

Spare disk drives can also be connected to the SCSI controllers SC3 and SC4 by providing additional driver/receivers, not shown in FIG. 9.

Thus, by connecting the spare disk drives in parallel to each of the SCSI controllers respectively, if a failure has occurred in the disk drives connected to each SCSI controllers, the spare disk drive connected to the SCSI controller comprising the faulty disk drive, can be used as the alternate disk drive. Therefore, there is less possibility of plural accesses, as described with respect to embodiment 2, competing to one SCSI controller simultaneously.

Embodiment 4

In the embodiments 1 to 3, the spare controller is eliminated by using a driver/receiver, but the spare controller can be eliminated without using it.

Figure 10:
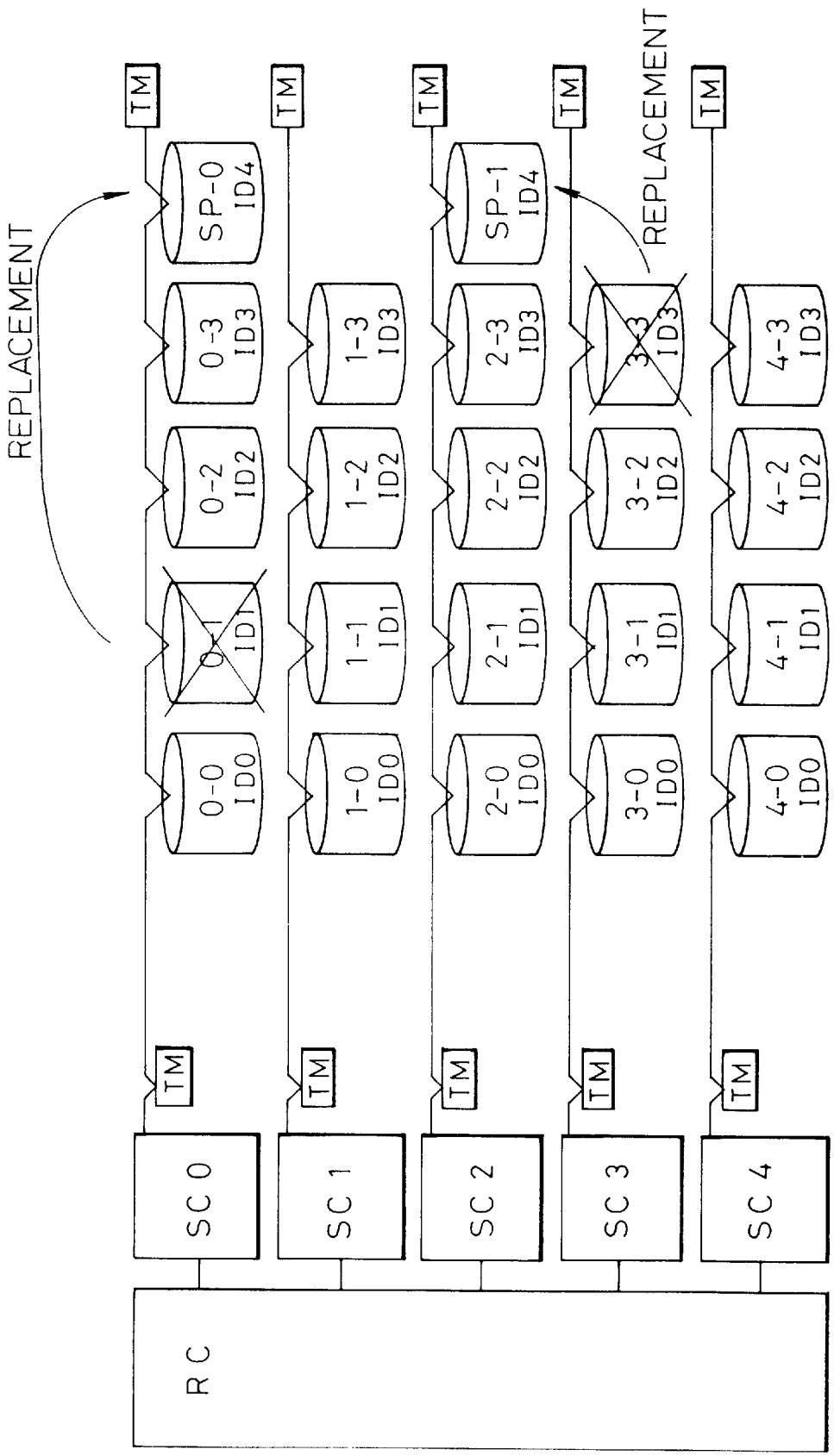
FIG. 10 shows a configuration of the disk array drive according to a fourth embodiment of the present invention.

FIG. 10 shows a configuration of the disk array drive in a fourth embodiment. Here, a spare disk drive is connected in series with the disk drive. For example, the spare disk drive SP-0 is connected to the SCSI interface SC0. In the same way, the spare disk drive SP-1 is connected to the SCSI controller SC2. The ID number of the spare disk drives SP-0 and SP-1 is ID4. Therefore, it is possible to distinguish the spare disk drive from the other disk drives according to this ID number. For example, if the disk drive 0-1 develops a fault, it is alternated with the spare disk drive SP-0 connected to the same SCSI controller with the disk drive 0-1.

If the disk drive 3-3 develops a fault, it is alternated with the spare disk drive SP-1 connected to the SCSI controller SC2 because the spare disk drive isn't connected to the SCSI controller SC3. When the disk drive 0-1 is alternated with the spare disk drive SP-0, an access to the ID1 is converted to an access to ID4 by the SCSI controller SC0 because both of the drives are connected to the same SCSI controller.

On the other, when the disk drive 3-3 is alternated with the spare disk drive SP-1, the "disk drive 3-3 connected to the SCSI controller SC3" is alternated with the "spare disk drive SP-1 connected to the SCSI controller SC2" in the RAID controller RC. In this case, plural accesses, as described in Embodiment 2, compete to the SCSI controller 2. In the SCSI controller 2 or the RAID controller RC, the control for the access order is performed to resolve the competition.

In the arrayed recording apparatus based on this embodiment, a spare controller SPC to control the spare disk drives isn't needed because the spare disk drive is connected to the SCSI controller which controls the disk drives. The spare disk drive is controlled under the SCSI controller which controls the disk drives, and the RAID controller RC distinguishes the disk drive from the spare disk drive for accessing.

Embodiment 5

Figure 11:
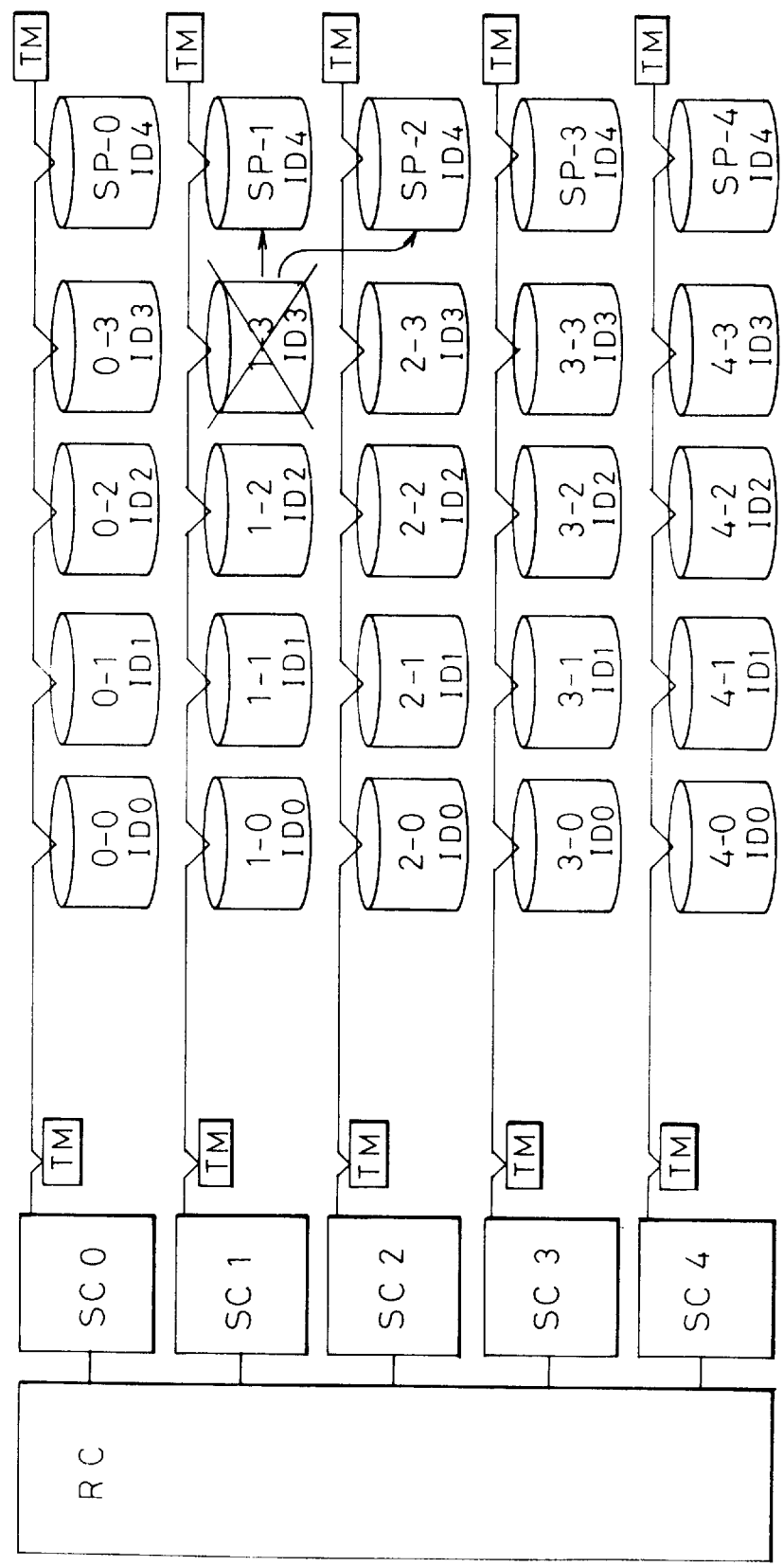
FIG. 11 shows a configuration of the disk array drive according to a fifth embodiment of the present invention.

In the above embodiment 4, the apparatus based on the present invention comprises two spare disk drives. However, the spare disk drives can be connected to each of the SCSI controllers respectively, as shown in FIG. 11.

Furthermore, plural spare disk drives, not shown in the figure, can be connected in series to each of the SCSI controllers. For example, the SCSI controller 0 has a capability to connect two additional spare disk drives because ID5 and ID6 aren't used as the ID numbers.

Embodiment 6

Embodiments 1 through 5 show examples using plural SCSI controllers. As shown in FIG. 12 and FIG. 13, it is possible for the apparatus to include only one SCSI controller. When only one SCSI controller is provided, disk drives 0-0 to 0-3 arranged in one dimensional space compose a redundant group. Thus, the disk array apparatus as described in the preceding examples can be created. When a disk drive in the redundant group develops a failure, the faulty disk can be replaced with the spare disk drive connected with the driver/receiver, in the embodiment shown in FIG. 12. In the embodiment shown in FIG. 13, the faulty disk can be alternated with the spare disk drive connected to the same SCSI controller.

Embodiment 7

Figure 14:
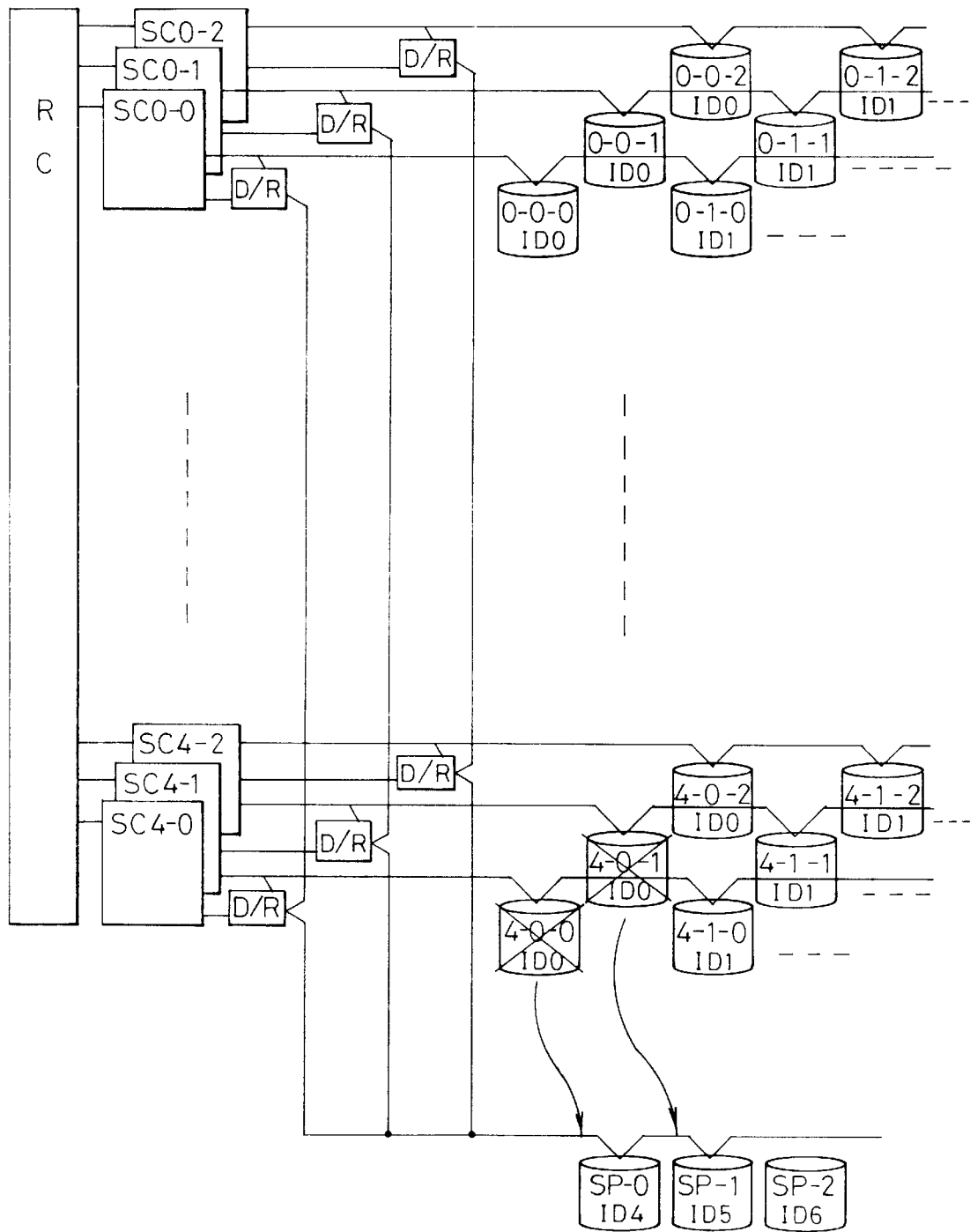
FIG. 14 shows a configuration of a disk array drive arranged in three-dimensional space according to a seventh embodiment of the present invention.

FIG. 14 shows the case when disk drives are arranged in three-dimensional space. Even in case that disk array drives are arranged in three-dimensional space, spare disk drives can be used. For example, in FIG. 14, if the disk drive 4-0-0 develops a failure, it can be alternated with the spare disk drive SP-0. Further if the disk drive 4-0-1 develops a failure, it can be replaced with the spare disk drive SP-1. FIG. 14 shows an example of the first embodiment shown in FIG. 1, applied to the three-dimensional space. But it is possible to apply the other embodiments described above to a disk array apparatus arranged in the three-dimensional space.

Embodiment 8

In the above-described embodiments 1 to 7, one faulty disk drive is exchanged with one spare disk drive. In this eighth embodiment, one faulty disk drive is replaced with plural spare disk drives.

Figure 15:
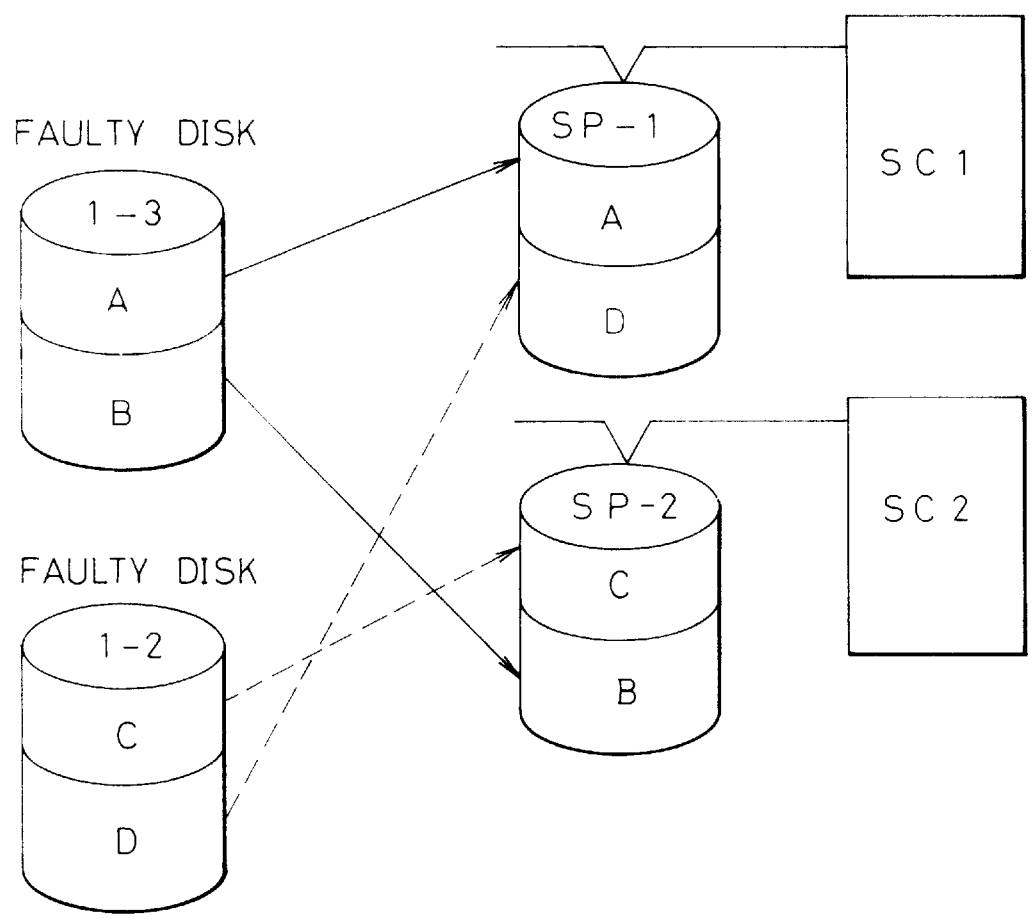
FIG. 15 shows a conceptional view in case of recovering data to the plural spare disk device according to an eighth embodiment of the present invention.

As shown in FIG. 11, if the disk drive 1-3 develops a fault, it is replaced with the two spare disk drives SP-1 and SP-2. FIG. 15 is a diagrammatic illustration showing how faulty disk drive 1-3 is replaced with the spare disk drives SP-1 and SP-2. Data A and B in the disk drive 1-3 are recovered in the spare disk drives SP1 and SP-2 separately. For example, the first half of data in the disk drive is recovered to the recording area in the spare disk drive SP-1 (shown as A in FIG. 15) and the second half of data is recovered to the recording area in the SP-2 (shown as B). Under the circumstances, if the next fault has occurred and the disk drive 1-2 develops a fault, the first half of data in the disk drive 1-2 is recovered to the other recording area in the spare disk drive SP-2 (shown as C), and the second half of data in the disk drive 1-2 is recovered to the other recording area in the spare disk drive SP-1 (shown as D).

At a result, by recovering data into plural disk drives, time needed for recovering is reduced. And after replacement of the faulty disk, data can be restored to the alternate disk at a high speed.

Figure 16:
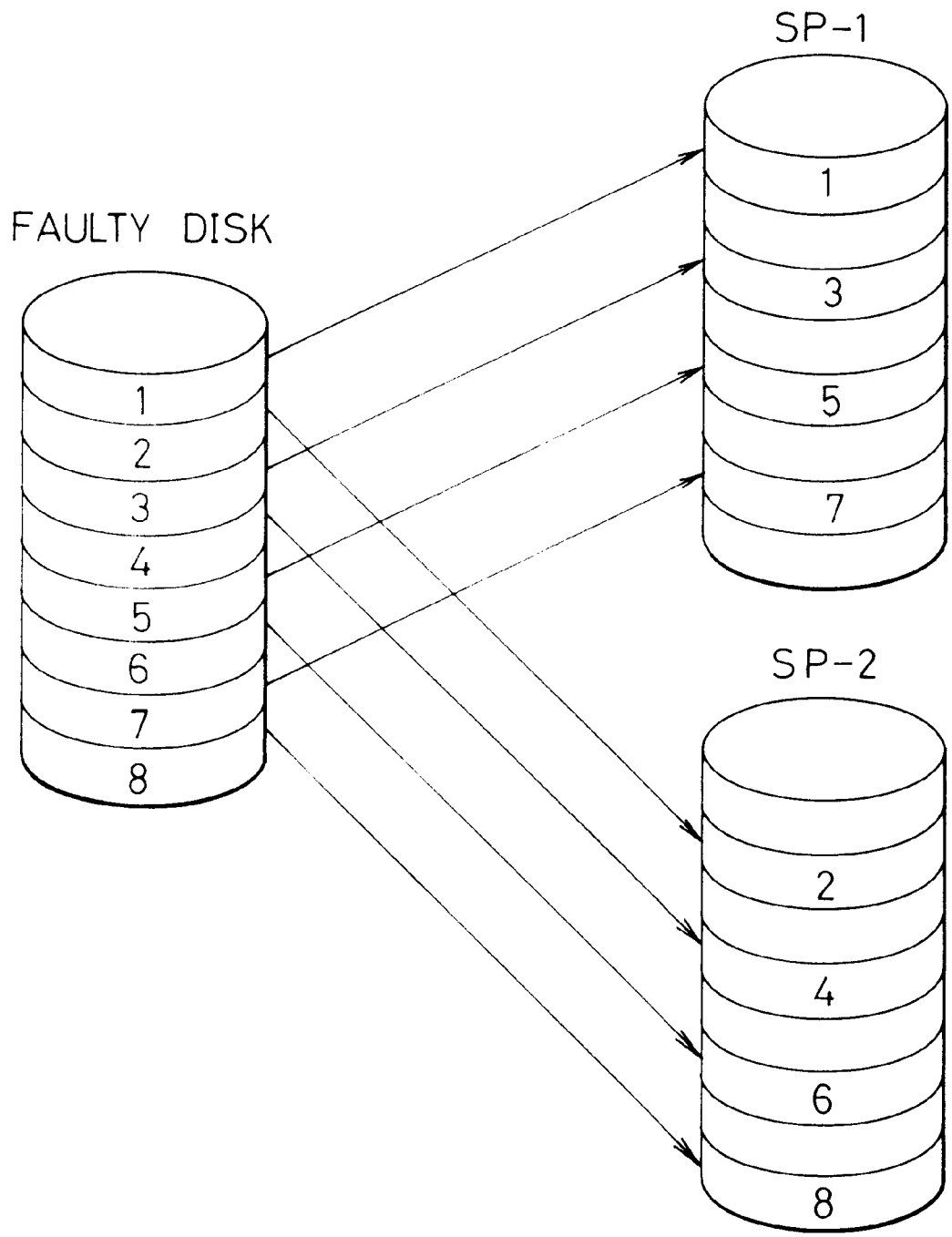
FIG. 16 shows a conceptional view in case of recovering data to the plural spare disk drives according to second embodiment.

FIG. 16 shows another embodiment using plural spare disk drives. In FIG. 15, the first and second halves of data in the faulty disk drive are recovered to the corresponding spare disk drives. In FIG. 16, there is shown the case that data is recovered in block or address units of the faulty disk drive. In FIG. 16, numeral 1 to 8 show blocks or addresses in the faulty disk. The spare disk drive SP-1 recovers data in the odd numbered blocks or addresses of the faulty disk. The spare disk drive SP-2 recovers data in the even numbered blocks or addresses of the faulty disk.

Other ways, not shown in the figure, of recovering data into the spare disks can be employed, such as recovering data in cylinder units, recovering data in track units, recovering data in file units, or recovering data in directory units.

In the arrayed recording apparatus based on this embodiment, the accesses to the spare disk drive are separated into the plural spare disk drives when data in the faulty disk drive is recovered to the spare disk drive because plural spare disk drives are used so as to replace one faulty disk drive.

Further, when data in the spare disk drive is copied to a new disk drive after exchanging the faulty disk drive with the new disk drive, the copy process can be completed at higher speed by reading out data from the plural spare disk drives, comparing to reading out data from one spare disk drive.

Embodiment 9

Figure 17:
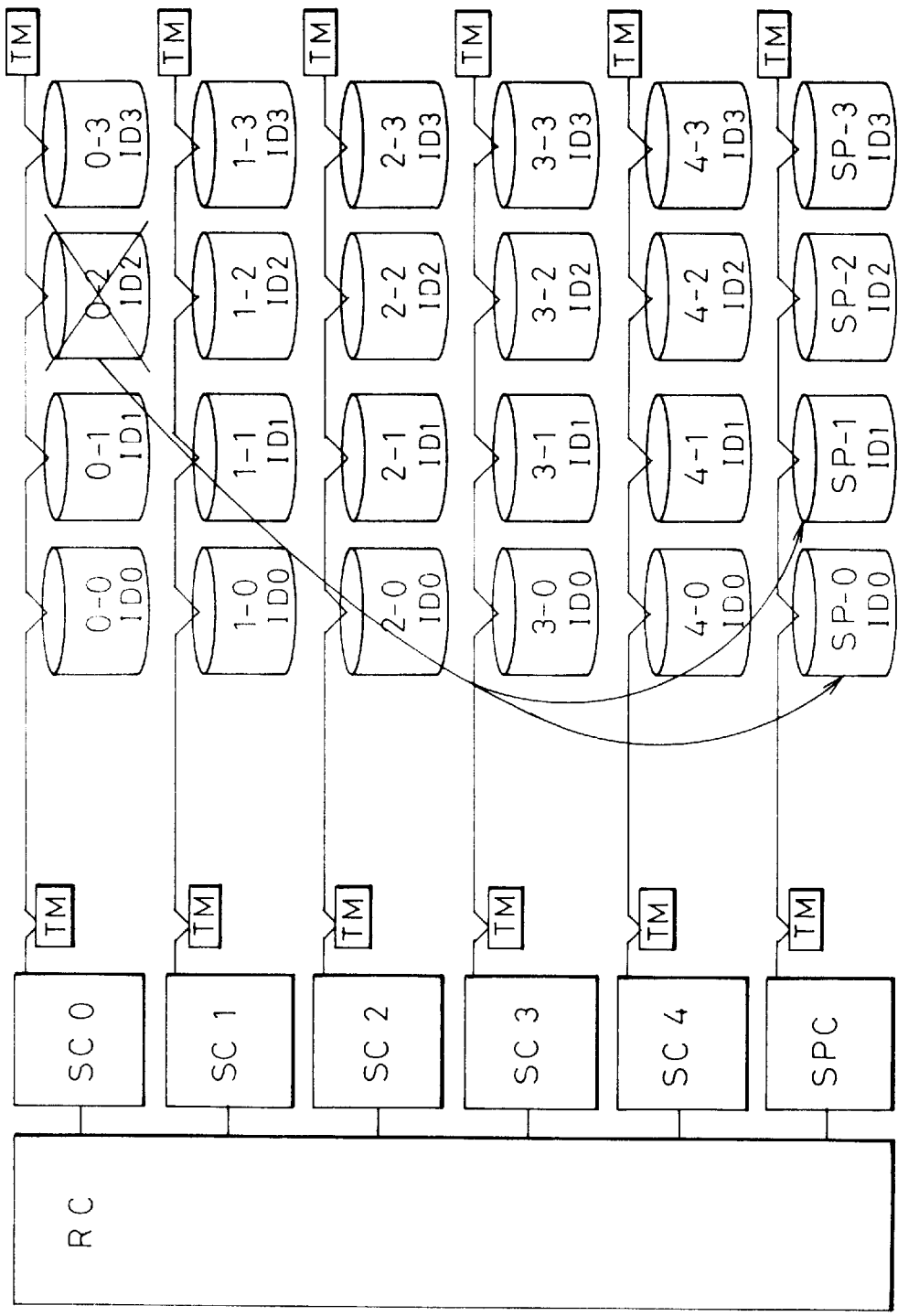
FIG. 17 shows a configuration of the disk array drive according to ninth embodiment of the present invention.

FIG. 17 illustrates another embodiment in which data in the faulty disk is recovered into plural spare disk drives. The configuration shown in FIG. 17 is the same one that is described in the related art, except that one faulty disk is replaced with plural spare disk drives. For example, if the disk drive 0-2 develops a fault, it is replaced with the spare disk drives SP-0 and SP-1.

In the preceding embodiments, there is shown the case that one faulty disk drive is recovered using two spare disk drives. But, plural spare disks, not less than two, can be used for the alternation.

In this invention, other sorts of interfaces can be applied, instead of the SCSI interface.

In the above embodiments, though it is not especially mentioned, magnetic disk drives, optical disk drives or compact disk drives can be used as the disk drives. It is not necessary to specify the sort of the recording medium for this invention. Further, in the preceding embodiments, there is shown the case of disk drives being used for constituting the arrayed recording apparatus. But, instead of the disk drives, other recording medium for storing data can be used for this invention.

What is claimed is:

1. An arrayed recording apparatus comprising:

a plurality of groups of recording devices for storing data, each group being serially connected to a data channel;

a plurality of channel controllers, each channel controller being connecting a data channel of a respective group of recording devices;

a control means for controlling data accesses to the recording devices through the channel controllers;

a spare device for replacing one of the recording devices of one of the groups of recording devices and storing data; and connect means, receiving a request from the control means when the one of the recording devices is to be replaced, for connecting the spare device to a data channel and a channel controller connected to the replaced recording device while the replaced recording device is to be replaced;

wherein the control means changes data accesses to the replaced recording device to data accesses to the spare device.

2. The arrayed recording apparatus of claim 1, wherein each of the recording devices and the spare device have respective identifications, and wherein the control means changes the identification of the recording device designated in a data access command to the identification of the spare device to change a data access to the replaced recording device to a data access of the spare device.

3. The arrayed recording apparatus of claim 1 further comprising a plurality of spare devices for storing data, wherein the replaced recording device is replaced by the plurality of spare devices.

4. An arrayed recording apparatus comprising:

a plurality of groups of recording devices for storing data, each group being serially connected to a data channel;

a plurality of channel controllers, each channel controller being connecting a data channel of a respective group of recording devices;

a control means for controlling data accesses to the recording devices through the channel controllers;

a spare device for replacing one of the recording devices of one of the groups of recording devices and storing data;

wherein a channel controller connected to the replaced recording device connects the spare device to the respective data channel while one of the recording devices is to be replaced; and wherein the control means changes data accesses to the replaced recording device to data accesses to the spare device when one of the recording devices is to be replaced.

5. An arrayed recording apparatus comprising:

(a) a plurality of recording devices serially coupled together for storing data;

(b) a bus for coupling the plurality of recording devices and transferring data;

(c) a spare device for replacing one of the recording devices;

(d) connect means for coupling the spare device to the bus while one of the recording devices is to be replaced; and (e) access means for accessing the recording devices through the bus, and for requesting that the selective connect means couple the spare device and the bus so as to replace one of the recording devices with the spare device.

6. The arrayed recording apparatus of claim 5, wherein the access means includes coupling request means for requesting coupling the spare device and the bus, and wherein the selective connect means includes driver/receiver means for coupling the spare drive and the bus according to the coupling request requested by the coupling request means.

7. The arrayed recording apparatus of claim 6, wherein the bus has a plurality of signal lines, wherein the spare disk has a corresponding plurality of signal lines, and wherein the driver/receiver means has a plurality of line connect means for respectively connecting the corresponding signal lines of the bus and the spare drive according to the coupling request.

8. The arrayed recording apparatus of claim 7, wherein the access means includes direction output means for outputting a direction of data transfer to the driver/receiver means, and wherein the driver/receiver means includes switch means for switching the direction of data transfer in the plurality of signal lines connected by the line connect means.

9. The arrayed recording apparatus of claim 5, wherein the access means assigns an identification to each of the recording devices and the spare device respectively, and includes altering access means for altering an identification in a request so as to replace the recording device with the spare device.

10. The arrayed recording apparatus of claim 9, wherein the access means includes a SCSI controller, the bus is a SCSI bus, and the identification are ID used for SCSI.

11. The arrayed recording apparatus of claim 10, wherein the altering access means includes identification memory means for registering the identification alternation, and access change means for changing data accesses with the identification of the replaced recording device to data accesses with identification of the spare device referring to the identification registered by the identification memory means.

12. The arrayed recording apparatus of claim 11, wherein the access means includes disk control means for accessing the recording devices, for recognizing a necessity to replace one of the recording devices, for requesting the coupling request means to output the coupling request, and for requesting the identification memory means to register the altered identification.

13. The arrayed recording apparatus of claim 12, wherein the disk control means is a RAID controller for configuring redundant groups of data with the recording devices, wherein the RAID controller includes recovery means for recovering data in the replaced recording device to the spare device based on redundant groups of data.

14. The arrayed recording apparatus of claim 5, further comprising:

at least one other group of a plurality of recording devices serially coupled together for storing data;

at least one other bus for coupling each group of recording devices and transferring data; and wherein the access means includes a plurality of channel controllers each of which connects to one group of recording devices through a corresponding bus.

15. The arrayed recording apparatus of claim 14, further comprising a plurality of selective connect means, each of the selective connect means being connected to at least one channel controller and to the spare device.

16. The arrayed recording apparatus of claim 15, wherein the plurality of selective connect means are connected serially and connects the spare device commonly.

17. The arrayed recording apparatus of claim 15, further comprising a plurality of spare devices, and wherein each of the selective connect means connects to one spare device.

18. A device replacement method in an arrayed recording apparatus having a plurality of groups of recording devices for storing data, each group being serially connected by a data channel, a plurality of channel controllers for connecting respective groups of the recording devices, a control means for controlling data accesses to the recording devices through the channel controllers, a spare device for replacing one of the recording device and storing data, comprising the steps of:

a) connecting the spare device to the data channel of a first channel controller corresponding to a group having a recording device to be replaced by selective connect means while the recording device is to be replaced;

b) generating a request in the control means to connect the first channel controller and the spare device through the selective connect means;

c) registering the replacement of the recording device by the spare device;

d) changing an access request for the replaced recording device to an access request for the spare device based on the registered replacement.

19. A device replacement method in an arrayed recording apparatus having a plurality of groups of recording devices for storing data, each group being serially connected to a data channel, a plurality of channel controllers for connecting respective groups of the recording devices, a control means for controlling data accesses to the recording devices through the channel controllers, a spare device for replacing one of the recording device and storing data, comprising the steps of;

a) connecting the spare device to a data channel and a channel controller connected to a group including the recording device to be replaced;

b) registering the replacement of the recording device by the spare device; and c) changing an access for the replaced recording device to an access for the spare device based on the registered replacement.

20. The device alternation method of claim 19, further comprising the step of assigning identifications to the recording devices and the spare device respectively, wherein the registering step stores the identifications of the replaced recording device and the spare device, and the changing step changes an identification in an access to the replaced recording device to the identification of the spare device based on the registered identifications.

21. A hot-standby system for an arrayed recording apparatus, said arrayed recording apparatus including a plurality of recording devices, the plurality of recording devices being serially connected, and a control means connected to said plurality of recording devices for controlling accesses to said plurality of recording devices, said hot-standby system comprising:
at least one spare recording device; and
replacement means for replacing at least one of said plurality of recording devices which is determined to be faulty with said at least one spare recording device, the replacement means including:
connect means for connecting said at least one spare recording to said control means for access to said at least one spare recording device while one of the recording devices is to be replaced.

22. The hot-standby system of claim 21, wherein said replacement means includes altering access means, as part of said control means, for changing accesses to said at least one faulty recording device to said at least one spare recording device.

23. The hot-standby system of claim 22, wherein each of said plurality of recording devices and said at least one spare recording device has an identification, and wherein said altering access means changes an identification for said at least one faulty recording device in an access to an identification for said at least one spare recording device.

24. The hot-standby system of claim 23, wherein said control means includes at least one SCSI controller, and wherein each of said identifications is an ID used for SCSI.

25. The hot-standby system of claim 21, wherein said control means requests said selective control means to connect said at least one spare recording device.

26. The hot-standby system of claim 21, further comprising:
at least one other group of a plurality of recording devices serially coupled together for storing data; and
wherein said control means includes a plurality of channel controllers, each of said channel controllers being connected to one of said groups of said recording devices.

27. The hot-standby system of claim 26, wherein said at least one spare recording device is connected to one of said plurality of channel controllers.

28. The hot-standby system of claim 26, wherein said at least one spare recording device is connected to at least two of said channel controllers.

29. The hot-standby system of claim 28, wherein said replacement means includes a plurality of selective control means for selectively connecting said at least one spare recording device to at least one of at least two channel controllers for accesses to said at least one spare recording device through said at least one channel controller.

30. The hot-standby system of claim 29, wherein said control means requests said plurality of selective control means to connect said at least one spare recording device to said at least one channel controller.

31. The hot-standby system of claim 26, further comprising a plurality of spare recording devices, and wherein at least two of said channel controllers are connected to at least one distinct spare recording device.

32. The hot-standby system of claim 21, wherein said replacement means includes data transfer means for recording data stored in said faulty recording device in said at least one spare recording device.

33. The hot-standby system of claim 32, wherein said plurality of recording devices are divided into redundant groups, and wherein data is simultaneously stored in each of the recording devices within each redundant group, and wherein said data transfer means records data from recording devices which are part of a redundant group with said faulty recording device to said spare recording device.

34. The hot-standby system of claim 32, wherein said data transfer means divides said data stored in said faulty recording device into a plurality of portions for recording in a plurality of spare recording devices.

35. An arrayed recording apparatus comprising:
a plurality of recording devices for storing data, the recording devices being serially connected together by a data channel;
a control means connected to the plurality of recording devices through the data channel for controlling data accesses to the recording devices;
a plurality of spare devices for replacing one of the recording devices and storing data; and
selective connection means for connecting the plurality of spare devices to the data channel and the control means while a recording device is to be replaced;
wherein the replaced recording device is replaced by the plurality of spare devices.

36. An arrayed recording apparatus comprising:
a plurality of groups of recording devices for storing data, each group being serially connected together by a data channel;
a plurality of channel controllers, each channel controller being connected to a respective data channel and group of recording devices;
a control means for controlling data accesses to the recording devices through the channel controllers;
a spare device for replacing one of the recording devices of one of the groups of recording devices and storing data; and
at least one selective connect means, each being connected to a respective one of the plurality of channel controllers and connecting the spare device to a respective data channel in parallel with a respective group of recording devices, the at least one selective connect means, receiving a request from the control means when the one of the recording devices is to be replaced, selectively connects the spare device and the data channel of one of the plurality of channel controllers so as to reform a group of recording devices to include the connected spare device while one of the recording devices is to be replaced;
wherein the control means changes data accesses to the replaced recording device to data accesses to the spare device in the reformed group of recording devices using the selectively connected one of the plurality of channel controllers.

37. An arrayed recording apparatus comprising:
a plurality of groups of recording devices for storing data, each group being serially connected by a data channel;

a plurality of channel controllers, each channel controller being connected to a respective group of recording devices;

a control means for controlling data accesses to the recording devices through the channel controllers;

a spare, device for replacing one of the recording devices of one of the groups of recording devices and storing data;

wherein a channel controller serially connects the spare device with a data channel and a respective one of the groups of recording devices; and wherein the control means changes data accesses to the replaced recording device to data accesses to the spare device when one of the recording devices is to be replaced.

38. An arrayed recording apparatus comprising:
    (a) at least one group of recording devices serially coupled together for storing data;
    (b) at least one bus for coupling the at least one group of recording devices and transferring data;
    (c) a spare device for replacing one of the recording devices;
    (d) selective connect means, being connected to the at least one bus and coupling the spare device in parallel with the at least one group of recording devices coupled to the at least one bus, for selectively coupling the spare device to the at least one bus while one of the recording devices is to be replaced; and
    (e) access means for accessing the recording devices through the at least one bus, and for requesting that the selective connect means couple the spare device and the at least one bus so as to replace one of the recording devices with the spare device and reforming the at least one group of recording devices by the connected spare device.

39. A device replacement method in an arrayed recording apparatus having a plurality of groups of recording devices for storing data, each group being serially connected by a data channel, a plurality of channel controllers for connecting respective data channels and groups of the recording devices, a control means for controlling data accesses to the recording devices through the channel controllers, a spare device for replacing one of the recording device and storing data, and at least one selective connect means being connected to a respective one of the plurality of channel controllers and connecting the spare device in parallel with a respective group of recording devices, comprising the steps of:
    a) selectively connecting the spare device and a data channel of a first one of the channel controllers by the at least one selective connect means so as to reform a group of recording devices to include the spare device;
    b) generating a request in the control means to connect the first one of the channel controllers and the spare device through the selective connect means;
    c) registering the replacement of the recording device by the spare device;
    d) changing an access request for the replaced recording device to an access request for the spare device connected to the first one of the channel controllers based on the registered replacement.

40. A device replacement method in an arrayed recording apparatus having a plurality of groups of recording devices for storing data, each group being serially connected by a data channel, a plurality of channel controllers for connecting respective data channels and groups of the recording devices, a control means for controlling data accesses to the recording devices through the channel controllers, a spare device for replacing one of the recording device and storing data, wherein a first one of the channel controllers serially connects the spare device with one of the groups of recording devices, comprising the steps of;
    a) connecting the spare device to a data channel of the first one of the channel controllers;
    b) registering the replacement of the recording device by the spare device; and
    c) changing an access for the replaced recording device to an access for the spare device based on the registered replacement.

41. An arrayed recording apparatus comprising:

a plurality of groups of recording devices for storing data, each group being serially connected by a data channel;

a plurality of channel controllers, each channel controller being connected to a respective data channel and group of recording devices;

a control means for controlling data accesses to the recording devices through the channel controllers;

a spare device for replacing one of the recording devices of a first one of the groups of recording devices connected to a first one of the channel controllers and storing data; and at least one selective connect means, each being connected to a corresponding one of the channel controllers and connecting the spare device in parallel with the respective groups of recording devices, receiving a request from the control means when the one of the recording devices is to be replaced, for selectively connecting the spare device to a data channel of a second one of the channel controllers so as to reform the groups of recording devices connected to the first one of the channel controllers and the second one of the channel controllers while the recording device is to be replaced;

wherein the control means changes data accesses to the replaced recording device to data accesses to the spare device in a reformed group of recording devices using the second one of the channel controllers.

42. An arrayed recording apparatus comprising:

a plurality of groups of recording devices for storing data, each group being serially connected by a data channel;

a plurality of channel controllers, each channel controller being connected to a respective data channel and group of recording devices;

a control means for controlling data accesses to the recording devices through the channel controllers;

a spare device for replacing one of the recording devices of a group of the recording devices connected to a first one of the channel controllers and storing data;

wherein a second one of the channel controllers serially connects the spare device with one of the groups of recording devices; and wherein the control means changes data accesses to the replaced recording device connected to the first one of the channel controllers to data accesses to the spare device connected to the second one of the channel controllers when one of the recording devices is to be replaced.

43. An arrayed recording apparatus comprising:
    (a) a plurality of groups of recording devices, each group being serially coupled together for storing data;

(b) a plurality of buses, each bus coupling a respective one of the groups of recording devices and transferring data;

(c) a spare device for replacing one of the recording devices connected to a first one of the plurality of buses;

(d) selective connect means for selectively coupling the spare device to a second one of the buses while the one of the recording devices is to be replaced; and (e) access means for accessing the recording devices through the plurality of buses, and for requesting that the selective connect means couple the spare device and the second bus so as to replace one of the recording devices with the spare device.

44. A device replacement method in an arrayed recording apparatus having a plurality of groups of recording devices for storing data, each group being serially connected by a data channel, a plurality of channel controllers for connecting respective data channels and groups of the recording devices, a control means for controlling data accesses to the recording devices through the channel controllers, a spare device for replacing one of the recording devices and storing data, and at least one selective connect means, each being connected to a corresponding one of the channel controllers and connecting the spare device in parallel with the respective groups of recording devices, comprising the steps of:

a) selectively connecting the spare device and a data channel for a first one of the channel controllers by the at least one selective connect means;

b) generating a request in the control means to connect the first one of the channel controllers and the spare device through the selective connect means;

c) registering the replacement of the recording device connected to a second one of the channel controllers by the spare device connected to the first one of the channel controllers;

d) changing an access request for the replaced recording device to an access request for the spare device based on the registered replacement.

45. A device replacement method in an arrayed recording apparatus having a plurality of groups of recording devices for storing data, each group being serially connected by a data channel, a plurality of channel controllers for connecting respective data channels and groups of the recording devices, a control means for controlling data accesses to the recording devices through the channel controllers, and a spare device for replacing one of the recording device and storing data, wherein a first one of the channel controllers serially connects the spare device with one of the groups of recording devices, comprising the steps of:

a) connecting the spare device to a data channel of a first one of the channel controllers;

b) registering the replacement of the recording device connected to a second one of the channel controllers by the spare device; and c) changing an access for the replaced recording device to an access for the spare device based on the registered replacement.

* * * * *